Dec. 28, 1954   D. SAMIRAN   2,698,191
REPLACEABLE HIGH PRESSURE COUPLING
Filed July 7, 1951   3 Sheets-Sheet 1

DAVID SAMIRAN
INVENTOR.

BY Edmund W. E. Kamm
ATTORNEY

Dec. 28, 1954  D. SAMIRAN  2,698,191
REPLACEABLE HIGH PRESSURE COUPLING
Filed July 7, 1951  3 Sheets-Sheet 2

DAVID SAMIRAN
INVENTOR.

BY Edmund W. E. Kamm
ATTORNEY

Dec. 28, 1954     D. SAMIRAN     2,698,191
REPLACEABLE HIGH PRESSURE COUPLING
Filed July 7, 1951     3 Sheets-Sheet 3
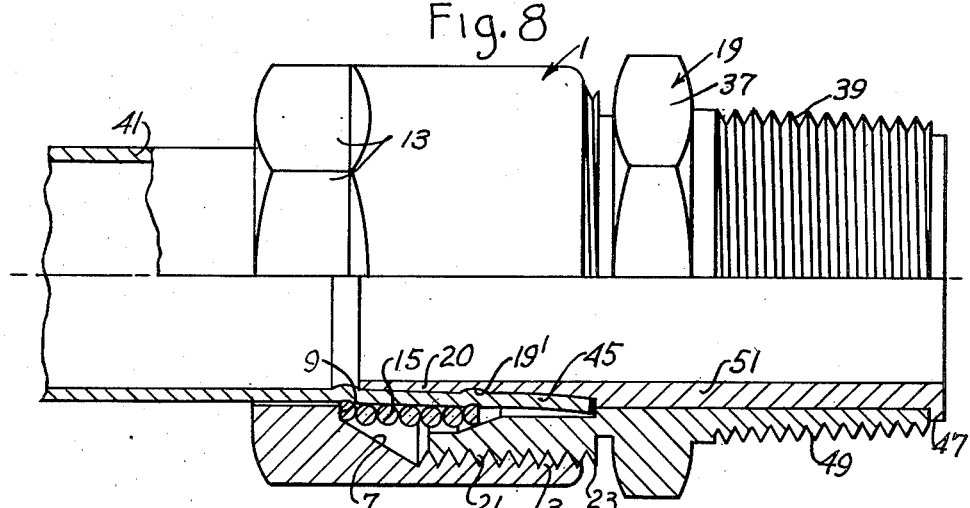
Fig. 8
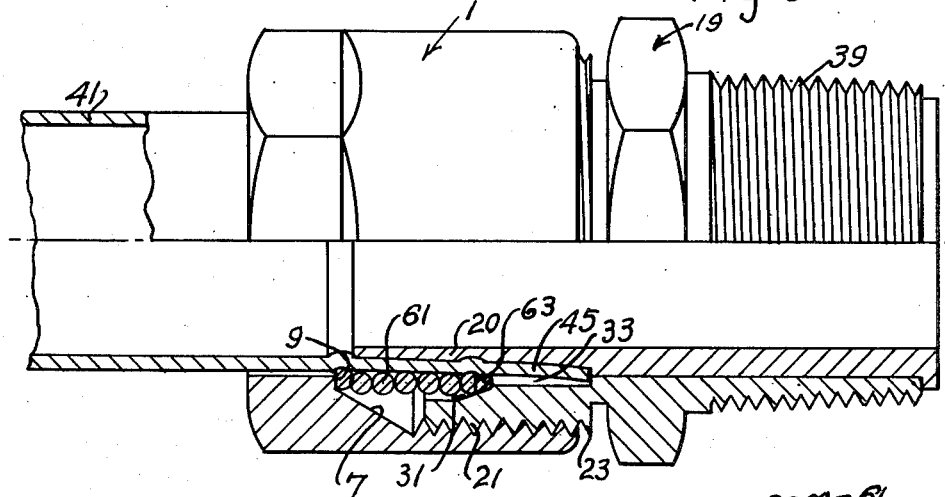
Fig. 9
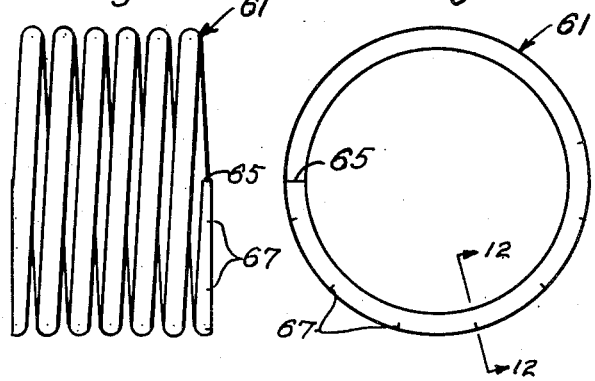
Fig. 10    Fig. 11
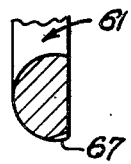
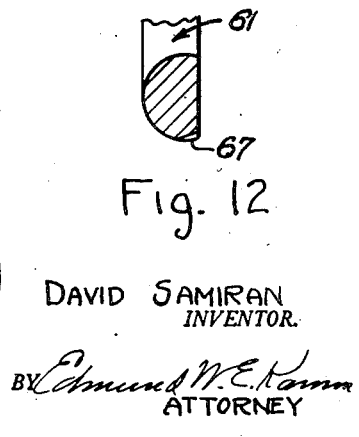
Fig. 12
DAVID SAMIRAN
INVENTOR.
BY Edmund W. E. Kamm
ATTORNEY United States Patent Office 2,698,191
Patented Dec. 28, 1954

2,698,191

REPLACEABLE HIGH PRESSURE COUPLING

David Samiran, Fort Wayne, Ind., assignor to Bowser, Inc., Fort Wayne, Ind., a corporation of Indiana Application July 7, 1951, Serial No. 235,595

11 Claims. (Cl. 285—86)

This invention relates to a coupling or fitting which is adapted for use with hose, plain tubing or other types of tubing and which is intended to function under high pressures such as occur particularly in aircraft hydraulic systems.

An object of the invention is to provide a coupling which is quickly and easily installed without the use of special tools or equipment.

Yet another object is to provide a coupling of the kind described in which the collar is resistingly held on the nipple to hold the coupling together as an integral unit.

Still a further object of the invention is to provide a coupling of the kind described in which the spring is wound with the ends projecting slightly tangentially but ground flush with the outside diameter of the spring to insure clearance between the hose and the end of the spring.

A further object of the invention is to provide a shoulder in the nipple in advance of the tapered seat to support one end of the spring during the making of the joint.

These and other objects will become apparent from a study of the specification and the drawings which are attached hereto and are made a part thereof and in which:

Figure 8 is a view similar to that of Figure 7 showing a modified form of threads.

Figure 9 is a view similar to that of Figure 7 showing a gasketed form of joint.

Figure 10 is a side elevation of the spring used with the joint of Figure 9.

Figure 11 is an end elevation of the spring of Figure 10.

Figure 12 is an enlarged cross-sectional view of the spring of Figure 11 taken substantially on line 12—12 thereof.

This application is a continuation in part of my application, Serial No. 81,240, filed March 14, 1949, for High Pressure Replaceable Coupling.

Figure 1:
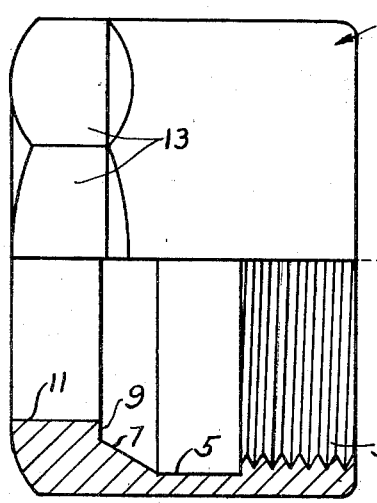
Figure 1 is a front elevation, partly in section, showing the collar.
Figure 2:
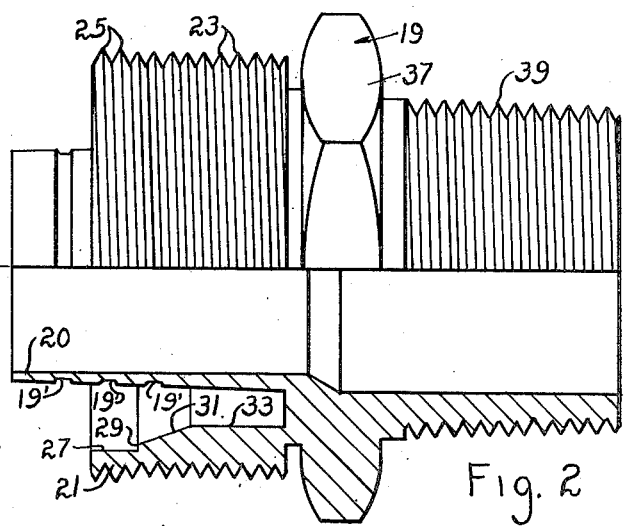
Figure 2 is a front elevation, partly in section, of the nipple.

The numeral 1 represents the collar, Figure 1, which is internally threaded at 3 and the threads are undercut to form a smooth bore 5 which merges with a frusto-conical surface 7 which terminates in a radial seat 9. The collar has a passage 11 for the hose or tube and has wrench flats 13 formed on its exterior.

The spring 15 is a helical coil of round wire having its helix formed opposite to that of the threads 3. Thus, if the latter are right-hand, the spring is left-hand.

Figure 3:
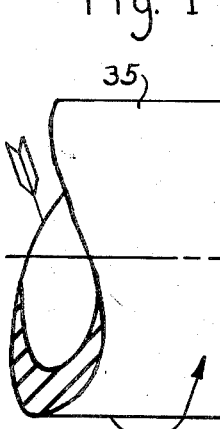
Figure 3 is an end elevation of the spring.

The ends 17 of the spring preferably extends slightly tangentially and are ground even with the outside diameter of the spring as is clearly shown at 18 in Figure 3.

Figure 6:
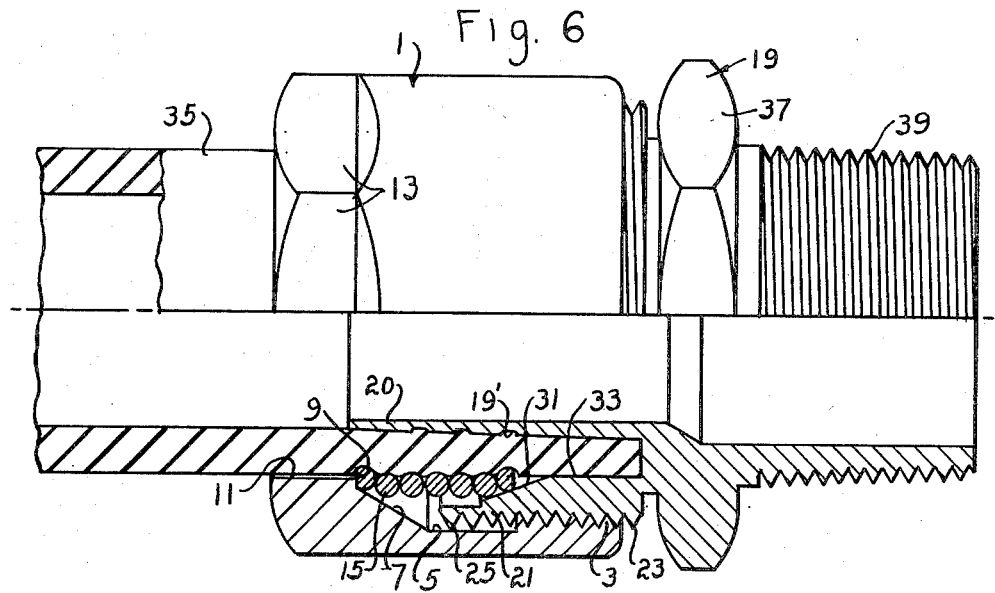
Figure 6 is an elevation, partially in section, showing the hose and coupling assembled with the collar tight on the nipple.

The nipple 19 when used with hose, comprises an axially extending externally tapered or frusto-conical guide tube 20 which is adapted to enter the hose or tube which is to be coupled. Three or more spaced grooves 19' are formed on the exterior of the tube, the innermost groove being in alignment with the inner terminal coil of the spring when in fully assembled position (Figure 6).

This guide tube is surrounded by an axially extending flange 21 which is radially spaced from it.

Figure 5:
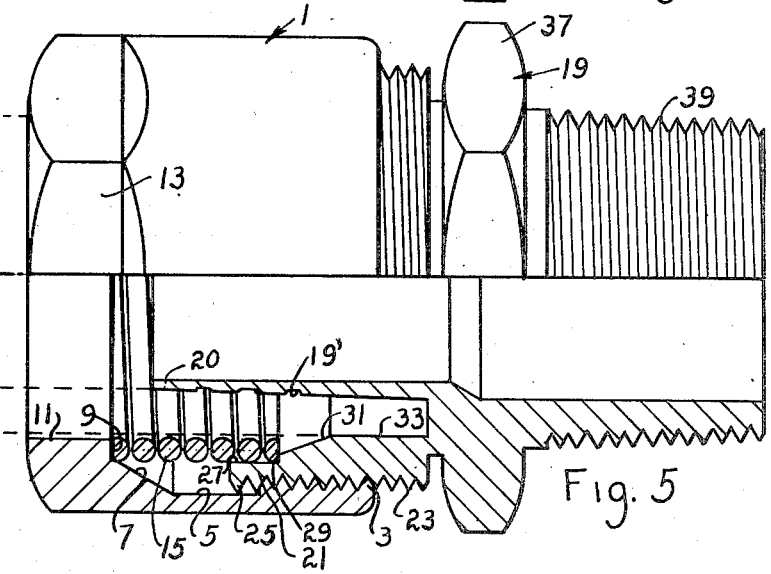
Figure 5 is a front elevation, partially in section, showing the coupling in loosely assembled condition to receive the hose.
Figure 4:
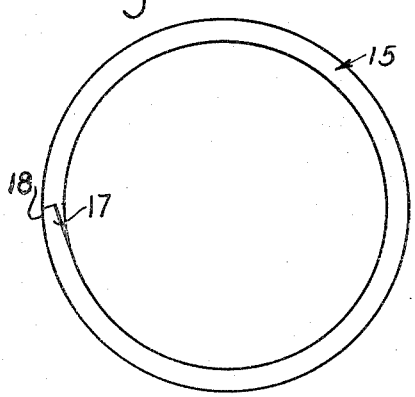
Figure 4 is a front elevation of the spring.
Figure 4:
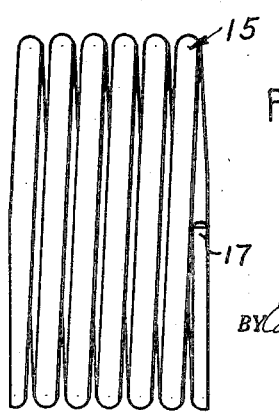

The flange is exteriorly threaded as at 23 and preferably, as is shown in Figure 5, the last or outer two threads 25, that is the threads which are adjacent the free end of the flange, are made slightly larger in external diameter so that while the collar 1 can be forced over these threads with a wrench it cannot be unscrewed from the nipple by hand. These threads normally ride in the bore 5 so that they offer no resistance to the rotation of the collar as it is tightened or loosened to the degree required to clamp or free the hose or tube.

The interior of the flange is provided with an axial, cylindrical bore 27, a radial spring seat 29 having only a small radial width, a frusto-conical seat 31 and an axial, cylindrical bore 33 which forms with the base of the guide tube 20, a receptacle for the hose 35.

A series of wrench flats 37 are provided on the exterior of the nipple and the other end of the nipple from the flange may be threaded as at 39 or be otherwise formed to connect to the rest of the fluid system.

Figure 7:
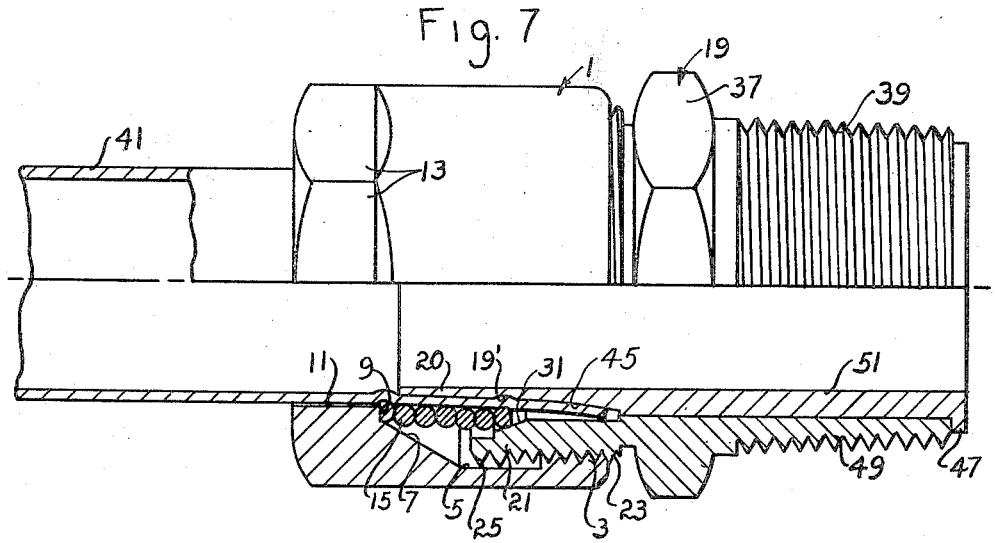
Figure 7 is a view similar to Figure 6 but showing a tubing joint.

The difference between the couplings shown assembled in Figures 6 and 7 is principally one of dimensions and other minor differences since the former is built to receive a relatively thick walled hose while the latter is for a thin walled tube 41. The tube 20 is shortened when used with tubing. In Figure 6, the tube extends beyond shoulder 9 into bore 11 whereas in Figure 7 it terminates short of this shoulder. The tubing coupling has only the single inner groove 19' which is located adjacent the lowermost coil of the spring, beyond which the taper merges into a radius 45 which accentuates the flare of the taper to insure rounding and a sealing fit of the tubing end on the tube 20. The tubing nipple is preferably shown as made in two pieces, the outer part 49 of aluminum or other light weight material and the inner part 51 of a hard material such as steel. The inner part has a radial flange 47 to limit the distance which it enters the outer part. The principles are the same in each case.

*Operation*

The coupling parts are preferably assembled as shown in Figure 5. This condition is with the collar unscrewed from the nipple as far as it is possible to do by hand, that is, until the two enlarged threads 25 engage the threads 3.

In this condition the spring 15 rests upon the seats 9 and 29 in the collar and nipple respectively and is expanded radially to its largest diameter since it rests against the bore 27.

The hose is inserted as shown in Figure 5 with a left-hand twist so that it will tend to expand the spring further. When the hose is entered upon the guide tube 20 and as far as possible in the recess 33, the collar 1 is screwed onto the nipple. The collar drags at one end of the spring while the nipple tends to anchor the other end so that the spring is wound into gripping engagement with the hose and as the diameter of the spring is reduced, it will escape from the seat 29 and will enter the tapered bore 31 which grips the lower end even more forceably. This is shown in Figure 6.

Further, as the spring is compressed to the right (Figure 6) and into the tapered bore 31, the hose tends to move with it so that the end of the hose 35 is forced against the nipple so as to insure a good seal both on the guide tube 20 and in the recess 35. Further, the spring forces the hose radially into the grooves 19' to further insure the seal between the inside of the hose and the tube 20. The final condition of the joint is shown in Figure 6.

Under test, this coupling has withstood pressures sufficient to burst the hose without leakage or pulling apart. These pressures are in the neighborhood of 4300 p. s. i.

The same general operation is followed with the thin walled tube coupling shown in Figure 7 except that the tube 20 is pounded into place in the tubing by applying a mallet to the exposed end 47. Further, since tube 20 does not extend past shoulder 9, the last coil of the spring in the collar is forced radially inwardly by taper 7 so as to deform the tubing inwardly around and against the end of tube 20 as shown in exaggerated form in Figure 7. The end coil of the spring in the nipple also crowds the tubing into the groove 19′ to insure a seal at that point.

It is understood, of course, that by suitably proportioning the parts, the coupling can be used for any wall thickness of hose, straight tubing or flexible tubing which are all included in the generic word conduit.

The form shown in Figure 8 is similar to that shown in Figure 7 except that the thread 23 is of uniform diameter throughout its length so that the collar may be unscrewed freely and entirely therefrom without the use of tools.

The form shown in Figure 9 is similar to that shown in Figure 7 except that an O-ring 63 of resilient material such as rubber is inserted in the bore 33 exteriorly of the tubing 41. This ring, when undeformed, is a true annulus of circular cross-section.

Further, the spring 61 differs from the spring 15 in that the outer periphery of the final turn which contacts the conical seat 31 is provided with nicks 67 or is otherwise roughened to hold the end of the spring from turning on the seat when the collar 1 is unscrewed. It has been found by experience that if the spring is not prevented from turning in such case, the corner 65 of the spring, which is usually sharp, will gouge and chew up the ring 63 to the extent that it is useless for further service.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a conduit coupling, a nipple having a tapered guide tube terminating in a free end, said guide tube taper converging toward the free end, an externally threaded flange on said nipple having a free end and disposed concentrically with respect to the guide tube and exteriorly thereof, said guide tube being adapted to slideably receive a conduit, a spring, said spring in its free state being cylindrical and helical, said spring having its coils spaced, said spring being disposed between the conduit and the flange, a collar having a first bore disposed at one end for receiving the conduit, a seat to support one end of the spring disposed adjacent the first bore, and extending radially outwardly therefrom, a threaded bore disposed at the other end of the collar for engaging the threads of the flange, a tapered spring seat disposed in the collar between the threaded bore and radial seat and the taper converging toward the latter, said spring being wound in a helix having a direction opposite to that of the threaded portions, said conduit being entered in the collar, spring and flange and over said guide tube, said threaded flange having a first cylindrical bore disposed adjacent its free end and terminating in a radially inwardly directed nipple spring seat, said spring seat adapted to support the other end of the spring when the coupling is not drawn up, a second cylindrical bore of a diameter smaller than said first cylindrical bore, extending away from and spaced from said nipple spring seat, a conical seat disposed between the nipple spring seat and said second cylindrical bore and converging toward the latter, whereby as said collar is screwed on the nipple, the collar end of the spring will be rotated and the spring will be constricted radially by said collar so that said other end will escape the nipple radial seat and enter said nipple conical seat and whereby said collar and spring will force the conduit axially along said guide tube as the collar is screwed on the threaded flange.

2. The structure defined in claim 1 wherein the end of the tube falls short of the collar radial seat when the coupling is tight whereby the conduit is deformed radially about the end of the tube to establish a seal.

3. The structure defined in claim 1 wherein the final few threads adjacent the free end of the flange are of greater diameter than the remainder of the threads thereon and the collar is undercut between the threads and the spring seat to clear the greater diametered threads.

4. The structure defined in claim 1 wherein the tube and flange are separate pieces, said flange having a bore to telescopically receive the tube, said tube having a radial flange at one end adapted to abut the end of the nipple opposite the threaded flange to limit the telescopic engagement.

5. In a conduit coupling, a nipple having a tapered guide tube terminating in a free end, said guide tube taper converging toward the free end, an externally threaded flange on said nipple having a free end and disposed concentrically with respect to the guide tube and exteriorly thereof, said flange having a cylindrical bore and a converging conical seat, said guide tube adapted to slideably receive a conduit, a spring, a collar having a first bore disposed at one end for receiving the conduit, a radially spring seat disposed adjacent the first bore, a threaded bore disposed at the other end of the collar for engaging the threads of the threaded flange, said spring being wound in a normally extended helix in its free state, said spring having a direction opposite to that of the threaded flange, said spring adapted to be compressed between the conical seat and the radial seat, said conduit being entered in the collar, spring and flange and over said guide tube, at least the final threads adjacent the free end of the flange being of sufficiently greater diameter than the other threads thereon to require the use of a tool to screw the collar thereon and said collar having an enlarged bore adjacent the inner end of the threads thereof to receive said greater diametered thread.

6. The structure defined in claim 1 wherein a seal ring of resilient material is interposed between the nipple conical seat and the end of the spring in contact with the tube.

7. The structure defined in claim 1 wherein a seal ring of resilient material is interposed between the nipple conical seat and the end of the spring in contact with the tube and wherein the portion of the spring having contact with the nipple conical seat is provided with means for resisting relative rotation therebetween.

8. The structure defined in claim 1 wherein a seal ring of resilient material is interposed between the nipple conical seat and the end of the spring in contact with the tube and wherein the portion of the spring having contact with the nipple conical seat is provided with means for resisting relative rotation therebetween, said means comprising nicks formed in said spring.

9. The structure defined in claim 1 wherein a seal ring of resilient material is interposed between the nipple conical seat and the end of the spring in contact with the tube and wherein the portion of the spring having contact with the nipple conical seat is provided with frictional means for resisting relative rotation therebetween.

10. In a conduit coupling comprising a nipple having a cylindrical bore and externally inwardly tapered guide tube adapted to telescope with said cylindrical bore, said tube having a radial flange at one end for limiting the telescopic engagement, said nipple haviing an externally threaded flange disposed concentrically of the guide tube and exteriorly thereof, a spring disposed between said tube and flange, a collar having a first cylindrical bore for the reception of the conduit, a frusto-conical surface terminating in a first radial seat adjacent said first bore, a threaded bore for engagement with the threaded flange, said spring being wound in a normally extended helix in its free state, said spring having a direction opposite to that of the threaded bore, said flange having a first cylindrical bore, a second radial seat terminating in a converging conical seat for receiving one end of said spring, said spring adapted to be compressed between the first radial seat and the conical seat, a second cylindrical bore adjacent said conical seat, said second bore being of smaller diameter than said first cylindrical bore, said conduit being entered in the collar, spring, flange and over said guide tube, whereby as said collar is screwed on the nipple, the collar end of the spring will be rotated and the spring will be constricted radially by said collar so that said other end will escape the flange radial seat and enter said flange conical seat and whereby said collar and spring will force the conduit axially along said guide tube which accentuates the flare of the taper to insure a sealing fit of the conduit end as the collar is screwed on the flange.

11. In a conduit coupling, a nipple having an axial guide tube, an externally threaded flange wherein at least the final thread adjacent the free end of the flange is of a greater diameter than the remainder of the threads thereon, said flange disposed concentrically of the guide tube and exteriorly thereof, said flange having a cylindrical bore and a converging conical seat, a spring disposed between said tube and flange, said spring being wound in a normally extended helix in its free state, said spring having a direction opposite to that of the threaded flange, a collar having a first bore for the reception of the conduit, a threaded second bore for engagement with the threaded flange, a smooth bore adjacent the threaded bore for receiving the greater diametered thread and a radial spring seat disposed between the smooth bore and first bore, said spring adapted to be compressed between the radial seat and the conical seat, said conduit being entered in the collar, spring, flange and over said guide tube, whereby said collar and spring will force the conduit axially along said guide tube as the collar is screwed on the flange.

References Cited in the file of this patent

UNITED STATES PATENTS

| Number | Name | Date |
|---|---|---|
| 192,636 | Collins | July 3, 1877 |
| 969,358 | Goodall | Sept. 6, 1910 |
| 978,630 | Oettgen | Dec. 13, 1910 |
| 2,351,726 | Wallace | June 30, 1944 |
| 2,516,583 | Moore | July 25, 1950 |
| 2,525,616 | Peeps | Oct. 10, 1950 |
| 2,561,827 | Soos | July 24, 1951 |